(12) United States Patent
Gong et al.

(10) Patent No.: US 11,749,936 B2
(45) Date of Patent: Sep. 5, 2023

(54) SEALING COVER AND MOLDING METHOD THEREOF

(71) Applicant: PANASONIC WANBAO APPLIANCES COMPRESSOR (GUANGZHOU) CO., LTD., Guangzhou (CN)

(72) Inventors: Pei Gong, Guangzhou (CN); Yan Deng, Guangzhou (CN)

(73) Assignee: PANASONIC WANBAO APPLIANCES COMPRESSOR (GUANGZHOU) CO., LTD., Guangzhou (CN)

( * ) Notice: Subject to any disclaimer, the term of this patent is extended or adjusted under 35 U.S.C. 154(b) by 0 days.

(21) Appl. No.: 17/542,883

(22) Filed: Dec. 6, 2021

(65) Prior Publication Data

US 2022/0094101 A1 Mar. 24, 2022

Related U.S. Application Data

(63) Continuation of application No. 17/604,145, filed on Oct. 15, 2021.

(30) Foreign Application Priority Data

Aug. 13, 2020 (CN) .......................... 202010812114.2

(51) Int. Cl.
*H01R 13/405* (2006.01)
*H01R 13/52* (2006.01)
(Continued)

(52) U.S. Cl.
CPC ....... *H01R 13/5213* (2013.01); *F04B 39/121* (2013.01); *H01R 9/16* (2013.01); *H01R 13/405* (2013.01)

(58) Field of Classification Search
CPC .... H01R 13/5213; H01R 9/16; H01R 13/405; F04B 39/121
See application file for complete search history.

(56) References Cited

U.S. PATENT DOCUMENTS 4,598,971 A 7/1986 Goodman
2002/0049004 A1 4/2002 Davis et al.
(Continued)

FOREIGN PATENT DOCUMENTS

CN 201812942 U 4/2011
CN 106059178 A 10/2016
(Continued)

OTHER PUBLICATIONS

International Search Report & Written Opinion dated Jun. 17, 2021 for PCT/CN2021/080015.

*Primary Examiner* — Tho D Ta
(74) *Attorney, Agent, or Firm* — Schmeiser, Olsen & Watts, LLP (57) ABSTRACT

Provided is a molding method of a sealing cover, realized by setting up a sealing cover mold, the mold includes a cavity and a core group arranged in the cavity, including setting up a first core and a second core, the mold opening direction of the first core and the second core are not parallel. The present application does not need a process hole to perform the injection molding of the sealing cover with a fastening structure, whose sealing is also better.

7 Claims, 5 Drawing Sheets

(51) Int. Cl.
*F04B 39/12* (2006.01)
*H01R 9/16* (2006.01)

(56) References Cited

U.S. PATENT DOCUMENTS

2012/0306118 A1    12/2012  Hayashi et al.
2020/0091649 A1 *   3/2020  Gong .................... H01R 13/41

FOREIGN PATENT DOCUMENTS

| CN | 206060438 U | | 3/2017 | |
|---|---|---|---|---|
| CN | 206236905 U | | 6/2017 | |
| CN | 208460865 U | | 2/2019 | |
| CN | 208723128 U | * | 4/2019 | |
| CN | 208723128 U | | 4/2019 | |
| CN | 110854559 A | | 2/2020 | |
| CN | 112038789 A | | 12/2020 | |
| JP | 058286 A | | 1/1993 | |
| KR | 20200091341 A | * | 7/2020 | |
| WO | 2010149175 A1 | | 12/2010 | |
| WO | WO-2020037973 A1 | * | 2/2020 | .............. F04B 39/00 |

* cited by examiner

SEALING COVER AND MOLDING METHOD THEREOF

CROSS-REFERENCE TO RELATED APPLICATIONS

This application is a continuation of U.S. application Ser. No. 17/604,145, having a filing date of Oct. 15, 2021, which claims priority to PCT/CN2021/080015, having a filing date of Mar. 10, 2021, which claims priority to Chinese Patent Application No. 202010812114.1, having a filing date of Aug. 13, 2020, the entire contents all of which are hereby incorporated by reference.

FIELD OF TECHNOLOGY

The following application relates to the field of sealing covers, in particular to a sealing cover and a molding method thereof.

BACKGROUND

Compressors which are used to convert low-pressure gases into high-pressure gases have been widely applied to refrigeration equipment such as air conditioners and refrigerators. A compressor is usually provided with terminal posts on its top, through which the compressor is connected to an external power source for its power supply. When connecting to an external power source, wiring terminals are generally used to clamp terminal posts for electrical connection. If there is moisture, water seepage, etc. at the connection between terminal posts and wiring terminals, it will cause leakage, short circuit, etc. Therefore, the sealability between terminal posts and wiring terminals is required to be high. A sealing cover is needed to sleeve the connection between terminal posts and wiring terminals. During installation, the sealing cover is sheathed on the terminal fixing base of the compressor to be fastened on the top of the compressor.

Figure 1:
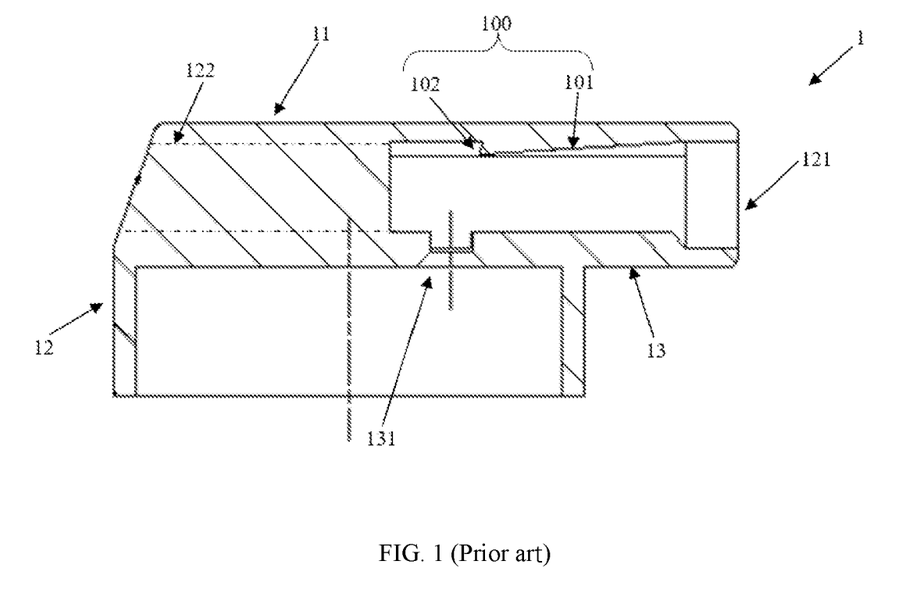
FIG. 1 is a side sectional view of a sealing cover in the conventional art.

Chinese Publication No. CN208723128U discloses a sealing cover 1 and a wiring terminal 2. Referring to FIG. 1, the sealing cover 1 includes a top cover 11, a side wall 12, a bottom plate 13 and side plates (not labelled), wherein the side wall 12 surrounds the top cover 11 and forms a half-surrounded space with an opening at one side. The bottom plate 13 is arranged in the half-surrounded space and fixed on the side wall 12. The side of the bottom plate 13 facing the top cover 11, the top cover 11 and the side wall 12 together form the wire fixing part (not labelled) to accommodate wiring terminals 2; the side of the bottom plate 13 facing away from the top cover 11 and the side wall 12 together form the fitting space (not labelled) to mount the sealing cover 1 on the terminal post fixing base (not shown), In the wire fixing part, the side wall 12 is provided with a wire guide port 121, which the wiring terminals 2 can penetrate to enter the wire fixing part.

The side plates are arranged in the wire fixing part and fixed between the top cover 11 and the bottom plate 13. Guide holes 131 are provided on the bottom plate 13 to communicate the wire fixing part and the fitting space, so that the terminal posts (not shown) of the compressor can penetrate the guide holes 131 from the fitting space to enter the wire fixing part. To prevent the wiring terminals 2 from disengaging, the top cover 11 is provided with positioning parts 100 facing the side plates of the bottom plate 13, which extend from the wire guide port 121 on the top cover 11, along the insertion direction of the wiring terminals 2. Each of the positioning parts 100 is provided with a limiting plate 101 facing the bottom plate 13 and a vertical plate 102 perpendicular to the top cover 11. The distance between the limiting plate 101 of the positioning parts 100 and the top cover 11 increases gradually along the insertion direction of the wiring terminals 2, i.e., the positioning part 100 inclines towards the bottom plate 13. The vertical plate 102 is located at the end away from the wire guide port 121 and is connected between the top cover 11 and the limiting plate 101.

Moreover, the sealing cover 1 is integrally formed by injection molding. Affected by the molding die, a process hole 122 is required to provide on the side wall 12, through which the wire fixing part is communicated with the outside of the sealing cover, and the process hole 122 is directly opposite to the wire guide port 121. In an embodiment, the extending direction of the process hole 122 is perpendicular to the vertical plate 102. During injection molding, two cores are inserted from the wire guide port 121 and the process hole 122 respectively, the plane of the vertical plate 102 is used as the parting plane, and the direction perpendicular to the vertical plate 102 is used as the mold opening direction. The molding is performed in such a way that the sealing cover 1 is molded by two cores whose mold opening directions are parallel to each other.

Figure 2:
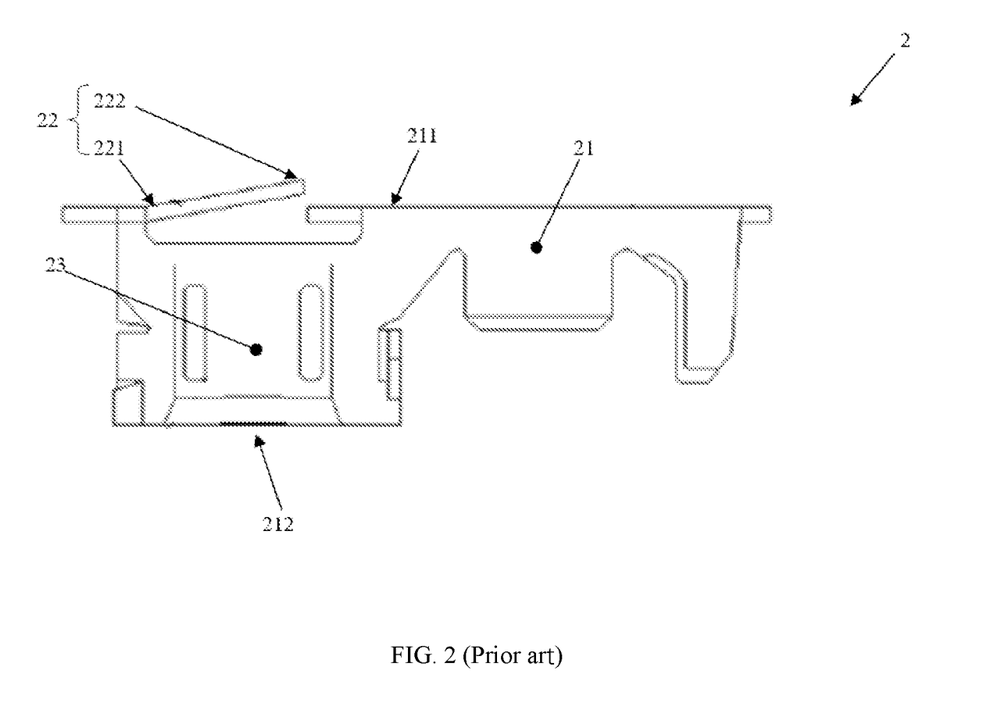
FIG. 2 is a structural view of a wiring terminal in the conventional art.

Referring to FIG. 2, each of the wiring terminals 2 inserted into the sealing cover 1 includes a lead wire fixing base 21, a resilient latch 22 and two symmetrically disposed clamping pieces 23, and the lead wire fixing base 21 is provided with an upper end surface 211 and a lower end surface 212 which is parallel to each other. The two clamping pieces 23 are oppositely connected between the upper end surface 211 and the lower end surface 212 and form an accommodating space for terminal posts. The resilient latch 22 is made of elastic material and is provided with a fixed end 221 and a movable end 222. The fixed end 221 is fixed on the upper end surface 211, and the movable end 222 rotates with the fixed end 221 as a fulcrum to be away from or close to the upper end surface 211. When the wiring terminal 2 is inserted into the wire fixing part of the sealing cover 1, the lower end surface 212 contacts with the bottom plate 13 of the sealing cover 1, the upper end surface 211 faces the top cover 11, the fixed end 221 is located at the side away from the wire guide port 121, and the movable end 222 is located at the side close to the wire guide port 121.

When in use, the wiring terminal 2 is being inserted into the sealing cover 1 from the wire guide port 121 until the movable end 222 passes through the vertical plate 102, and the movable end 222 is resisted by the vertical plate 102 so that the Snap-fit structure prevents the wiring terminal 2 from moving towards the wire guide port 121. Afterwards, the sealing cover 1 and the wiring terminal 2 form an upper cover assembly (not shown). The fitting space of the sealing cover 1 covers the terminal posts of the compressor, and the terminal posts are located between the two clamping pieces 23. Finally, a sealant is injected into the wire fixing part, the process hole 122 and the contacting area of the sealing cover 1 and the terminal post fixing base for sealing.

It can be seen from the above-mentioned sealing cover that in the conventional art, it is necessary to provide a fastening structure between a wiring terminal and a sealing cover, so that the wiring terminal does not easily disengage from the terminal sealing cover. However, the existing fastening structure often needs to provide a process hole for the mold core to enter and exit during injection molding. Meanwhile, a large amount of sealant needs to be injected into the process hole when filling the sealant. If insufficient sealant is filled, it will affect sealing. In addition, the inclined limiting plate and the upper end surface of the wiring terminal form an angle, which causes the wiring terminal to easily disengage, and the sealant not completely filled, which further affects sealing.

SUMMARY

An aspect relates to a sealing cover without any process hole.

The technology solutions of the present application are as following:

The present application relating to a sealing cover includes a top cover, a side wall, a bottom plate and side plates; the side wall surrounds one side of the top cover and forms a half- surrounded space; the bottom plate is arranged in the half-surrounded space and fixed on the side wall; the side of the bottom plate facing the top cover, the top cover and the side wall together form wire fixing part, and the side of the bottom plate facing away from the top cover and the side wall together form fitting space; the side plates are arranged in the wire fixing part and fixed between the top cover and the bottom plate; guide hole is provided on the bottom plate to communicate the wire fixing part and the fitting space; blind hole is provided at the inner side of the top cover in the wire fixing part with the same axis of the guide hole, and projected along the axis, the sectional shape of the blind hole and the guide hole are the same.

The sealing cover of the present application does not require a process hole provided on the sealing cover, which improves sealing, reduces sealant filling, and saves costs. Moreover, it improves production efficiency to save the process of filling the process hole with sealant.

In some embodiments, the inner side of the top cover in the wire fixing part is parallel to the bottom plate. After the wiring terminal is inserted into the sealing cover, the gap between the top cover and the wiring terminal is uniform, which benefits sealant filling and enhances sealing.

In some embodiments, the side wall in the wire fixing part is provided with a wire guide port; the inner side of the top cover in the wiring fixing part is further provided with limiting plate, which protrudes towards the bottom plate; the limiting plate is located between the blind hole and the wire guide port. The limiting plate can further prevent the wiring terminals from disengaging.

In some embodiments, a positioning plate disposed in the wiring fixing part is further provided. The positioning plate is connected between the top cover and the bottom plate, and the blind hole is located between the positioning plate and the wire guide port. When the wiring terminal is inserted into the sealing cover, the wiring terminal is positioned by the positioning plate.

In some embodiments, the axis of the guide hole is perpendicular to the bottom plate.

In some embodiments, the number of the side plates is at least two and the side plates are mutually parallel to each other. The adjacent side plates, the bottom plate and the top cover together form a wiring space; each wiring space is provided with a guide hole and a blind hole opposing to the guide hole. A plurality of wiring spaces is provided for a plurality of the terminal posts to insert.

In some embodiments, projected along the axial direction of the guide holes, the blind hole is provided with a circular arc portion and a convex portion connected to one side of the circular arc portion, and the convex portion protrudes outward along the radial direction of the circular arc portion.

In addition, the present application also provides a molding method of a sealing cover.

The molding method is realized by setting up a sealing cover mold with a cavity and a core group arranged in the cavity, which comprises steps of:

Setting up a first core; the first core comprises a molding base, a molding column and a cover molding block; the molding column and the cover molding block are arranged on the same end surface of the molding base, the height of the cover molding block is smaller than that of the molding column, and the cover molding block surrounds three sides of the molding column; the mold opening direction of the first core is parallel to the axial direction of the molding column;

Setting up a second core; the second core comprises a wire insertion space molding block and a through hole penetrating the wire insertion space molding block, and the sectional shape of the through holes projected along the axis of the through hole is the same as the sectional shapes of the molding column along the axis of the molding column; the mold opening direction of the second core is not parallel to the axis of the through hole;

Inserting the molding column of the first core into the through holes of the second core to form a core group; the wire insertion space molding block fits the cover molding block and one end surface extends outside the molding base;

Setting a cavity and put the core group into the cavity to perform injection molding of the sealing cover; a gap is formed between the molding base and the wire insertion space molding block, and the molding column is exposed outside the wire insertion space molding block;

Removing the first core from the sealing cover in a direction parallel to the axis of the molding column;

Removing the second core from the sealing cover in the mold opening direction thereof after the first core is removed from the sealing cover.

Compared with the conventional art, the molding method of the sealing cover does not need a process hole to perform the injection molding of the sealing cover with a fastening structure, whose sealing is also better.

In some embodiments, the axis of the molding column is perpendicular to the end surface of the molding base connected thereto.

In some embodiments, in the wire insertion space molding block, both end surfaces penetrated by the through holes are parallel to the end surface of the molding base where the molding column is located. The top cover of the obtained sealing cover is parallel to the end surface of the wiring terminal.

In some embodiments, after setting up the core group, in the wire insertion space molding block of the second core, the end surface outside the molding base is the outer end surface, and the end surface parallel to and directly opposite to the outer end surface is the inner end surface; there is a gap between the inner end surface and the cover molding block of the first core. The obtained sealing cover includes a positioning plate.

In some embodiments, when setting up the core group, projected along the axis direction of the molding column, the molding column is provided with arc molding portion and convex molding portion connected to one side of the arc molding portion, and the convex molding portion protrudes outward along the radial direction of the arc molding portion.

BRIEF DESCRIPTION

Some of the embodiments will be described in detail, with reference to the following figures, wherein like designations denote like members, wherein.

DETAILED DESCRIPTION

Figure 3:
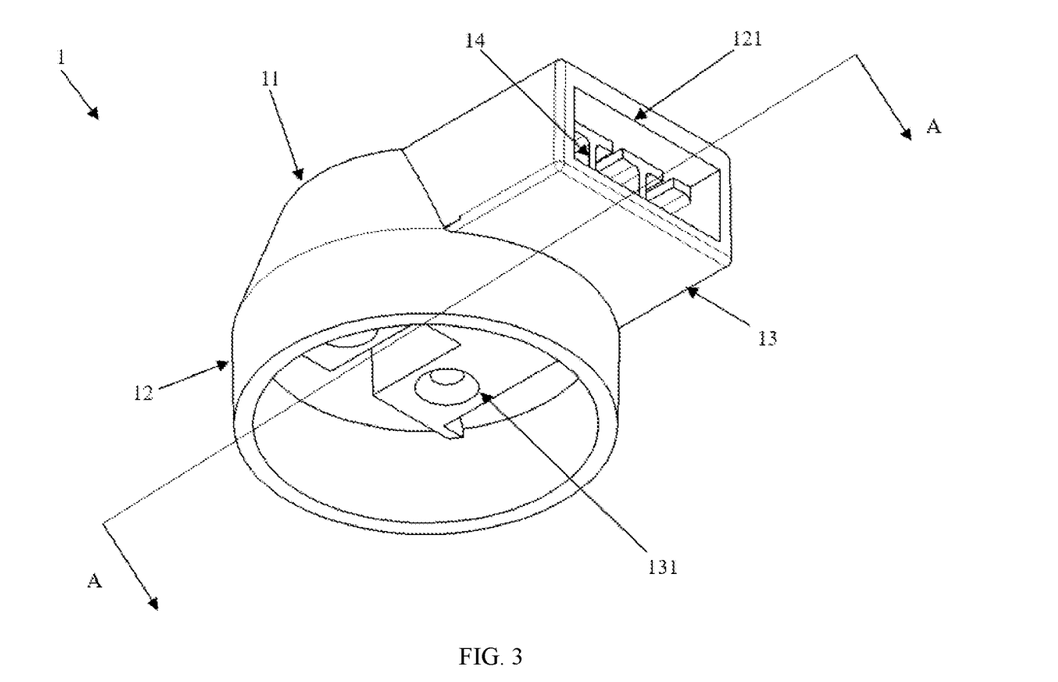
FIG. 3 is an overall structural view of a sealing cover in some embodiments of the present application.
Figure 4:
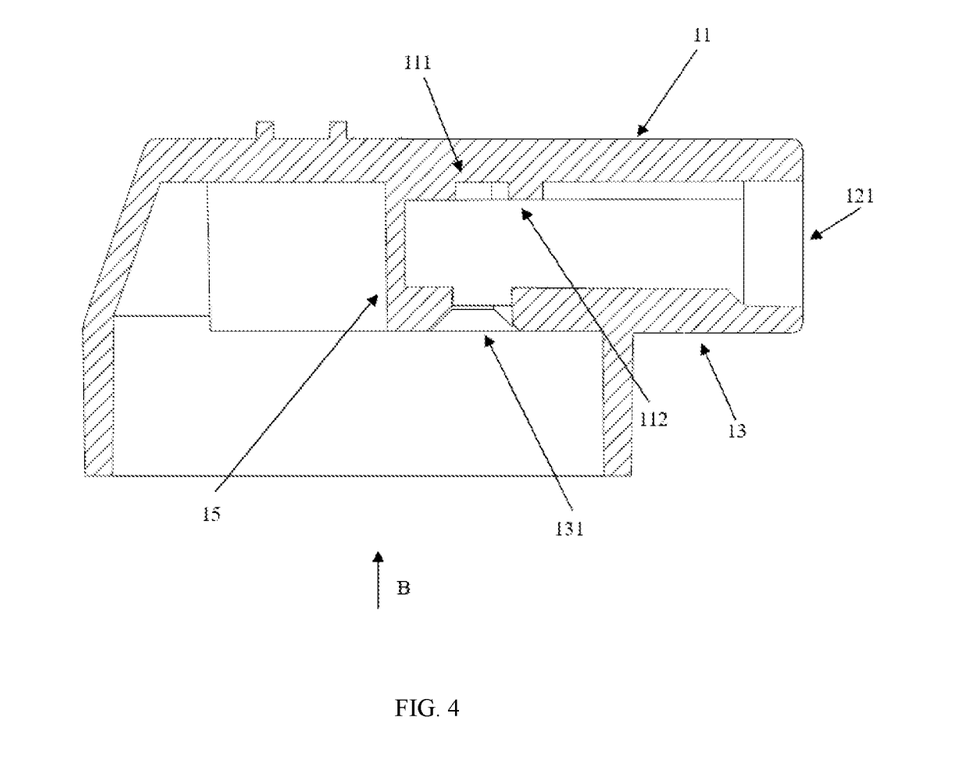
FIG. 4 is a sectional view along A-A of a sealing cover in some embodiments of the present application.
Figure 5:
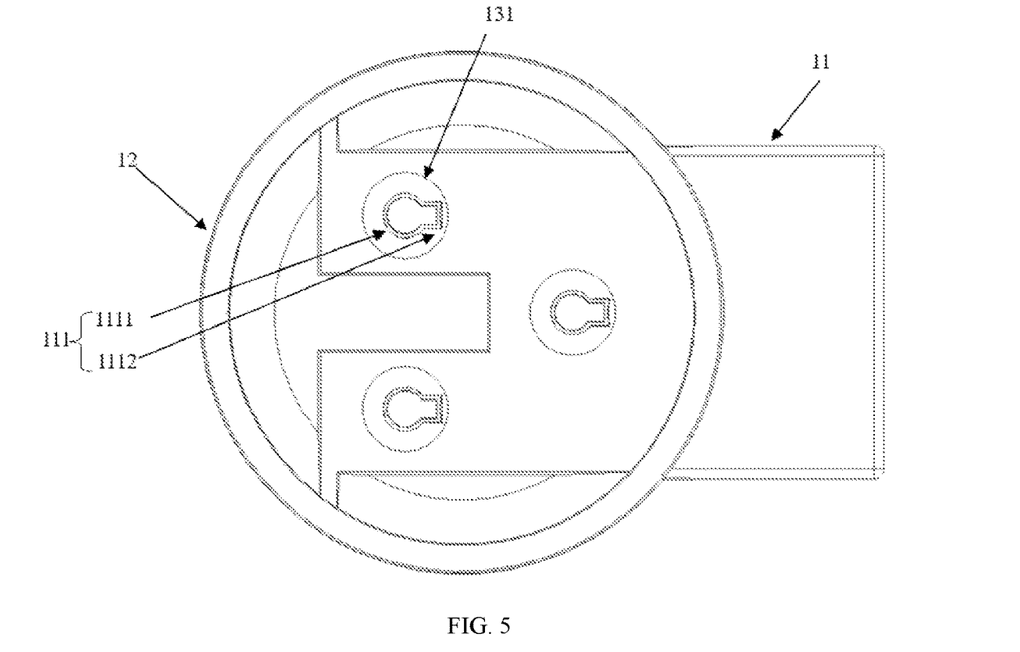
FIG. 5 is a sectional view along direction B shown in FIG. 4 in some embodiments of the present application.

Referring to FIGS. 3 toy, a sealing cover 1 of some embodiments of the present application includes a top cover 11, a side wall 12, a bottom plate 13 and side plates 14, wherein the side wall 12 surrounds the top cover 11 and forms a half-surrounded space with an opening at one side. The bottom plate 13 is arranged in the half-surrounded space and fixed on the side wall 12. The side of the bottom plate 13 facing the top cover 11, the top cover 11 and the side wall 12 together form the wire fixing part (not labelled) to accommodate wiring terminals 2; the side of the bottom plate 13 facing away from the top cover 11 and the side wall 12 together form the fitting space (not labelled) to mount the sealing cover 1 on the terminal post fixing base (not shown). In the wire fixing part, the side wall 12 is provided with a wire guide port 121, which the wiring terminals 2 can penetrate to enter the wire fixing part. The side plates 14 are arranged in the wire fixing part and fixed between the top cover 11 and the bottom plate 13. Guide holes 131 are provided on the bottom plate 13 to communicate the wire fixing part and the fitting space, so that the terminal posts (not shown) of the compressor can penetrate the guide holes 131 from the fitting space to enter the wire fixing part. Blind holes 111 are provided at the inner side of the top cover 11 in the wire fixing part with openings facing the bottom plate 13. The blind holes 111 have the same axes with the guide holes 131, and projected along the axes, the sectional shapes of the blind holes and the guide holes 131 are the same. In the present embodiment, projected along the axial direction of the guide holes 131, the openings of the guide holes 131 towards the fitting space are circular, while the openings of the guide holes 131 towards the wire fixing part have the same sectional shapes as those of the blind holes 111. Each of the blind holes 111 is provided with a circular arc portion 1111 and a convex portion 1112 connected to one side of the circular arc portion 1111, and the convex portion 1112 protrudes outward along the radial direction of the circular arc portion 1111. In an embodiment, the protrusion 1112 protrudes towards the wire guide port 121. After the terminal posts are inserted into the sealing cover 1, the terminal posts are located in the blind holes 111. In an embodiment, the axes of the terminal posts and the blind holes 111 are all perpendicular to the bottom plate 13.

In some embodiments, the number of the side plates 14 is more than two. A plurality of mutually parallel side plates 14 are connected between the bottom plate 13 and the top cover 11, and the adjacent side plates 14, the bottom plate 13, and the top cover 11 together form a wiring space. Each wiring space is provided with a guide hole and a blind hole opposing to the guide hole, so as to divide the wire fixing part into a plurality of wiring spaces according to the number of the terminal posts. In the present embodiment, the number of terminal posts on the terminal post fixing base is three, and the wire fixing part is divided into three wiring spaces by two side plates 14. Correspondingly, each wiring space is provided one blind hole 111 and one guide hole 131, that is, the number of the blind holes 111 and the guide holes 131 is three.

In some embodiments, in order to make the upper end surface 211 of the wiring terminal 2 fitting the sealing cover 1 better, the inner side of the top cover 11 in the wire fixing part is parallel to the bottom plate 13; the distance from the top cover 11 to the bottom plate 13 is equal to the distance from the upper end surface 211 to the lower end surface 212 of the wiring terminal 2, and is smaller than the distance from the movable end 222 to the lower end surface 212. After the wiring terminal 2 is inserted into the sealing cover 1, the upper end surface 211 and the lower end surface 212 of the wiring terminal 2 are in close contact with the top cover 11 and the bottom plate 13 respectively to prevent the wiring terminal 2 from disengaging.

In some embodiments, the top cover 11 is further provided with limiting plates 112 at the inner side of the wiring fixing part, which protrude towards the bottom plate 13, and are located between the blind holes 111 and the wire guide port 121. When the wiring terminal 2 is being inserted into the sealing cover 1 from the wire guide port 121, the resilient latch 22 of the wiring terminal 2 slides in along the top cover 11; when the resilient latch 22 is reaching the limiting plate 112, the limiting plate 112 presses the resilient latch 22 to deform elastically; after the resilient latch 22 passes through the limiting plate 112, the resilient latch 22 rebounds to its original shape; and the movable end 222 of the resilient latch 22 is resisted by the limiting plate 112, so that moving of the wiring terminal 2 towards the wire guide port 121 is prevented. The movable end 222 combines with the limiting plate 112 at the inner side of the top cover 11 to form a fastening structure to further prevent the wiring terminal 2 from disengaging.

In some embodiments, in order to better position the wiring terminal 2 when it is inserted, the sealing cover 1 further includes a positioning plate 15 connected between the top cover 11 and the bottom plate 13, and the blind holes 111 are located between the positioning plate 15 and the wire guide port 121. When the wiring terminal 2 is inserted into the sealing cover 1 and its side thereof opposite to the wire guide port 121 is against the positioning plate 15, the fixed end 221 of the wiring terminal is located at the side of the positioning plate 15, and the movable end 222 is located in the blind hole 111, so as to realize the positioning of the wiring terminal 2.

Figure 6:
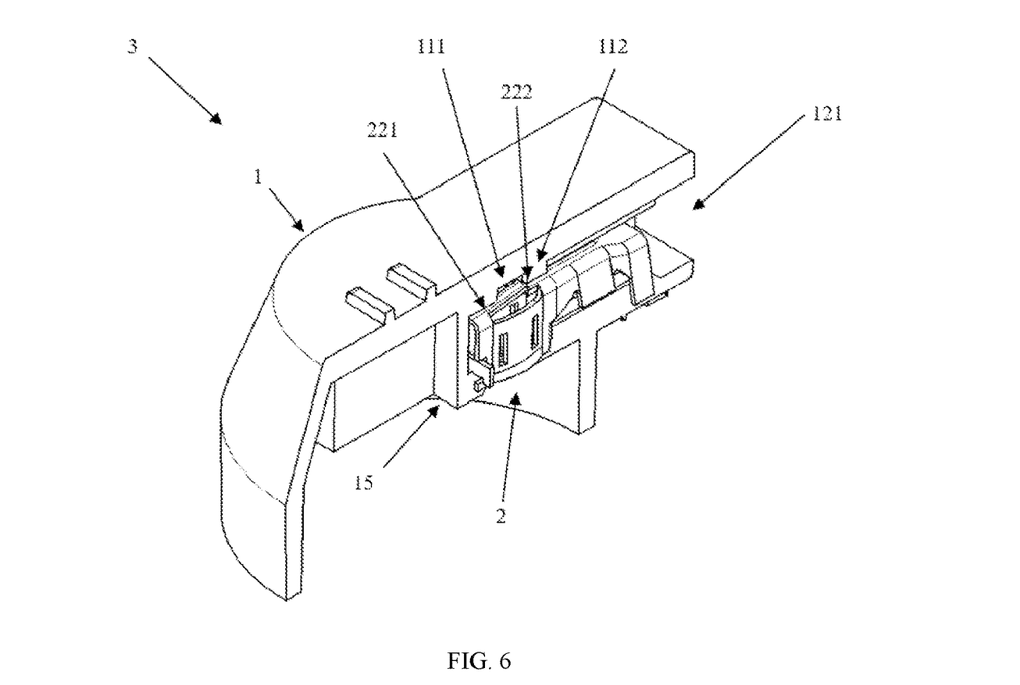
FIG. 6 is a sectional structural view along A-A shown in FIG. 3 of an upper cover assembly in some embodiments of the present application.

Referring to FIG. 6, the embodiments further provide an upper cover assembly 3. The upper cover assembly 3 comprises a sealing cover 1 and wiring terminals 2 in any embodiments mentioned above. When the wiring terminal 2 is being inserted into the wire fixing part from the wire guide port 121 of the sealing cover 1, the fixed end 221 of the wiring terminal 2 is located at the side away from the wire guide port 121, and its movable end 222 is located at the side close to the wire guide port 121. The wiring terminal 2 is being pushed away from the wire guide port 121 until its side away from the wire guide port 121 is against the positioning plate 15. During the movement of the wiring terminal 2, the movable end 222 of the resilient latch 22 passes through the limiting plate 112 with elastic deformation and restores to its original shape after entering the blind hole 111. The movable end 222 of the resilient latch 22 is resisted by the limiting plate 112, so that separation of the wiring terminal 2 from the sealing cover 1 is avoided.

Figure 7:
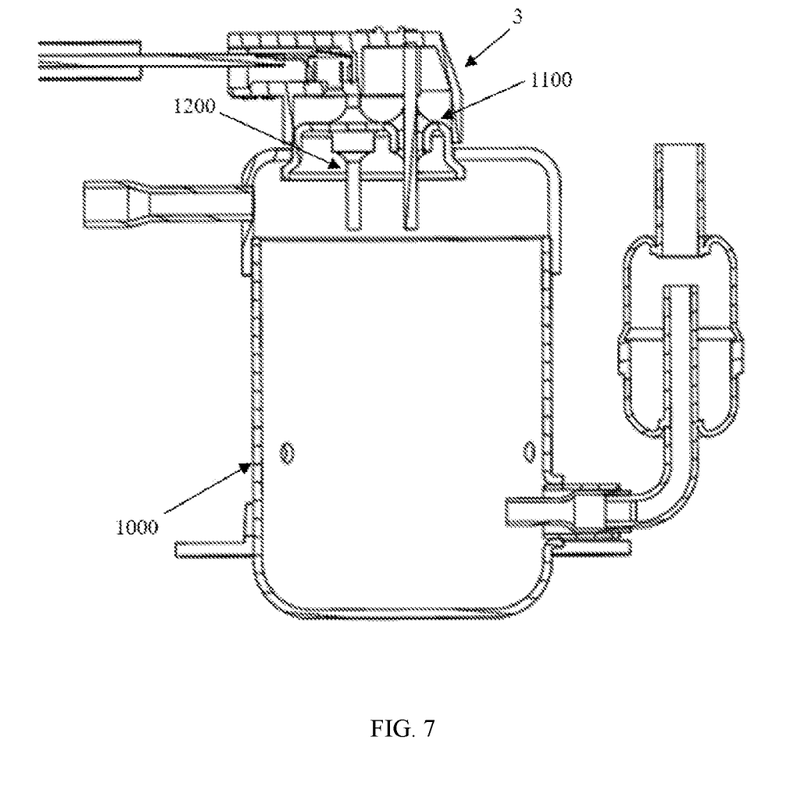
FIG. 7 is a side sectional view of an upper cover assembly used in a compressor in some embodiments of the present application.

Referring to FIG. 7, when assembled over a compressor 1000 of the conventional art, the upper cover assembly 3 is mounted on the terminal post fixing base 1100 with the opening of the fitting space of the sealing cover 1 facing the terminal post fixing base 1100 on the compressor; meanwhile the terminal post 1200 on the terminal post fixing base penetrates the guide hole 131 to enter the wire fixing part of the sealing cover 1 to be clamped by the two clamping pieces 23 of the wiring terminal 2. Finally, a sealant is injected into the wire guide port 121 and the contacting area of the sealing cover 1 and the terminal post fixing base for sealing. Since the distance between the upper end surface 211 and the top cover 11 is small, only a small amount of sealant is needed for sealing. Moreover, since the upper end surface 211 of the wiring terminal 2 and the top cover 11 are evenly spaced, the sealant is evenly distributed between the wiring terminal and the top cover 11, it is not easy to generate gaps, and thereby the sealing is enhanced.

In order to produce the above-mentioned sealing cover 1, a molding method thereof is also provided by the present application. The molding method of the sealing cover does not require a process hole 122 provided on the sealing cover 1. This method adopts the guide hole 131 of the sealing cover 1 and two cores whose mold opening directions are not parallel to each other to perform molding, wherein the mold opening direction of one core is parallel to the axis of the guide hole.

Figure 8:
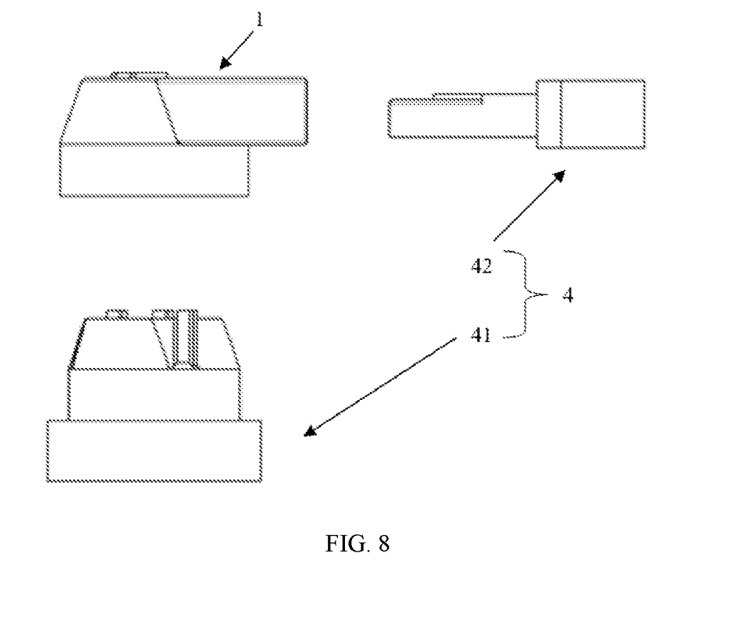
FIG. 8 is a structural view of a core group used for molding a sealing cover in some embodiments of the present application.
Figure 9:
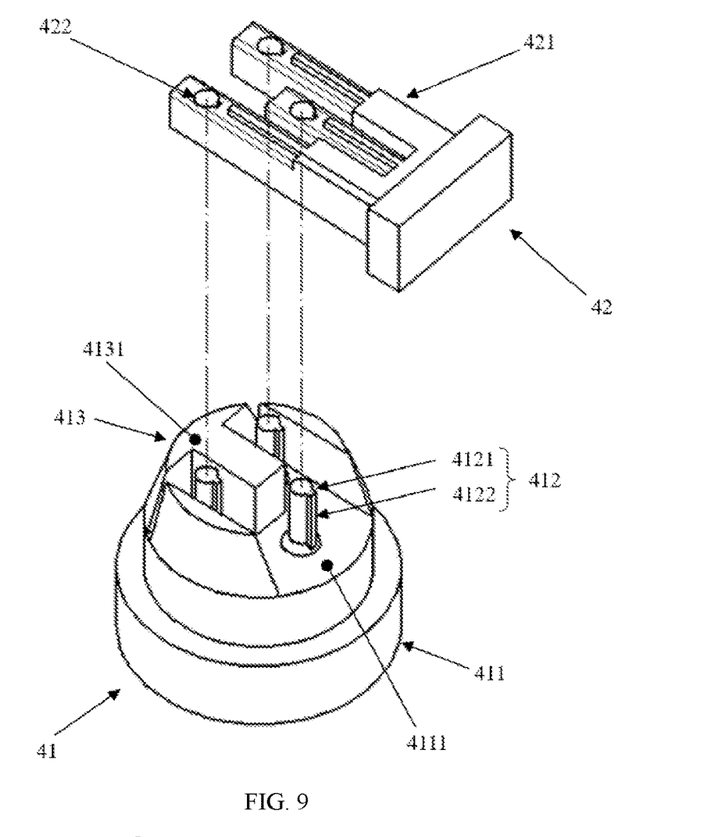
FIG. 9 is an installation diagram of a core group in some embodiments of the present application.
Figure 10:
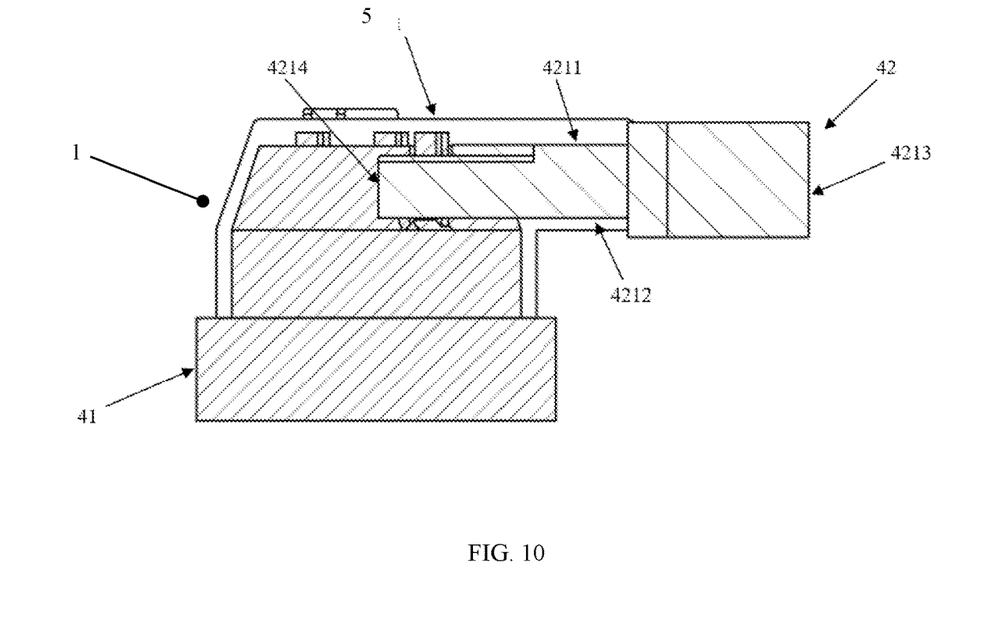
FIG. 10 is a sectional structural view along A-A of a molding die in some embodiments of the present application.

Referring to FIGS. 8 to 10, the method for molding the sealing cover of the present application is realized by setting up a sealing cover mold, which includes a cavity (not shown) and a core group 4. The core group 4 includes a first core 41 and a second core 42 whose mold opening directions are not parallel to each other. And specifically, it includes steps of:

Step S10: Set up a first core 41. The first core 41 comprises a molding base 411, a molding column 412 and a cover molding block 413. The molding column 412 extends from the first end surface 4111 of the molding base 411, and its extending direction is parallel to the mold opening direction of the first core 41. In an embodiment, the axis of the molding column 412 is perpendicular to the first end surface 4111. The cover molding block 413 is a convex block fixed on the first end surface 4111, its second end surface 4131 away from the molding base 411 is parallel to the first end surface 4111, the height of the cover molding block 413 relative to the first end surface 4111 is smaller than that of the molding column 412 relative to the first end surface 4111, and the cover molding block 413 surrounds three sides of the molding column 412.

Step S20: Set up a second core 42. The second core 42 comprises a wire insertion space molding block 421 and through holes 422, and the mold opening direction of the second core 42 is not parallel to the axes of the through holes 422; the mold opening direction of the core 42 is perpendicular to the axes of the through holes 422. The extending direction of the wire insertion space molding block 421 is the same as the inserting direction of the wiring terminals 2 to realize the forming of the wire insertion space. The through holes 422 are provided in the wire insertion space molding block 421, and the sectional shapes of the through holes 422 projecting along the axes of the through holes 422 are the same as the sectional shapes of the molding columns 412 projecting along the axes of the molding columns 412. In an embodiment, the third end surface 4211 and the fourth end surface 4212 of the wire insertion space molding block 421 penetrated by the through holes 422 are parallel to each other; in some embodiments, the third end surface 4211 and the fourth end surface 4212 are both parallel to the first end surface 4111.

Step S30: Insert the molding columns 412 of the first core 41 into the through holes 422 of the second core 42 to form a core group 4. In the wire insertion space molding block 421, three of the four end surfaces surrounding the third end surface 4211 and the fourth end surface 4212 are in contact with the cover molding block 413, and the rest one end surface is located outside the molding base 411, which is the outer end surface 4213; the outer end surface 4213 is perpendicular to the first end surface 4111. When setting up the core group 4, projected along the axis direction of the molding columns 412, the molding columns 412 are provided with arc molding portions 4121 and convex molding portions 4122 connected to one side of the arc molding portions 4121. The convex molding portions 4122 protrude outward along the radial direction of the arc molding portions 4121, and the convex molding portions 4122 protrude towards the outer end surface 4213.

Step S40: Put the core group 4 into the matching cavity 5 to perform injection molding of the sealing cover 1. Under the support of the cavity 5, a gap is formed between the wire insertion space molding block 421 and the molding base 411, and the molding columns 412 penetrate the through holes 422 and are exposed outside the wire insertion space molding block 421. In the wire insertion space molding block 421, the third end surface 4211 is far away from the molding base 411; the distance from the third end surface 4211 to the first end surface 4111 is the same as that from the second end surface 4131 to the first end surface 4111.

After the second core 42 is inserted into the first core 41, the wire insertion space molding block 421, the molding base 411, the cover molding block 413 and the cavity 5 together form the top cover 11, the side wall 12, and the side plates 14 of the sealing cover 1; the gap between the wire insertion space molding block 421 and the molding base 411 and the cavity together form the bottom plate 13. Since the molding columns 412 are disposed on the molding base 411, penetrate the wire insertion space molding block 421, and are exposed outside the wire insertion space molding block 421, that is to say, the molding columns 412 penetrate the bottom plate 13 and enter the top cover 11, so that coaxial guide holes 131 and blind holes 111 are respectively formed on the bottom plate 131 and the top cover 11.

In some embodiments, in step S30, after setting up the core group 4, in the wire insertion space molding block 421, the end surface parallel to and directly opposite to the outer end surface 4213 is the inner end surface 4214, the through holes 422 are located between the outer end surface 4213 and the inner end surface 4214, and a gap is provided between the inner end surface 4214 and the cover molding block 413 to form the positioning plate 15.

According to the number and position of the terminal posts, corresponding molding columns 412 and wire insertion space molding block 421 are arranged; the axes of the molding columns 412 are perpendicular to the end surface 4111; after the core group 4 is set up, the third end surface 4211 and the fourth end surface 4212 are both parallel to the first end surface 4111; the inner end surface 4214 is perpendicular to the first end surface 4111.

Step S50: Remove the first core 41 from the sealing cover 1 along the axes of the molding columns 412 after the sealing cover 1 is molded.

Step S60: Remove the second core 42 from the sealing cover 1 in a direction parallel to the first end surface 4111 after the first core 41 is removed and far away from the sealing cover 1; demolding of the sealing cover 1 is completed.

In summary, during injection molding, the mold opening directions of the first core 41 and the second core 42 are not parallel to each other. In addition, according to the position relationship between the insertion direction of the terminals 2 and the terminal posts, the angle between the mold opening direction of the first core 41 and the second core 42 is set to any value between 0 degree and less than 90 degrees, so that the terminals 2 can be inserted into the sealing cover 1 at different angles.

Compared with the conventional art, the sealing cover of the present application does not require a process hole provided on the sealing cover, which improves sealing, reduces sealant filling, and saves costs. Moreover, it improves production efficiency to save the process of filling the process hole with sealant. Further, the end surface of the sealing cover in the upper cover assembly is in close contact with the wiring terminal, and a fastening structure is provided to prevent the wiring terminal from disengaging. Moreover, the molding method of the present application is provided to produce the above-mentioned sealing cover 1 in injection molding production.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed:

1. A sealing cover, comprising:
a top cover, a side wall, a bottom plate and side plates; the side wall surrounds one side of the top cover and forms a half-surrounded space; the bottom plate is arranged in the half-surrounded space and fixed on the side wall; the side of the bottom plate facing the top cover, the top cover and the side wall together form wire fixing part, and the side of the bottom plate facing away from the top cover and the side wall together form fitting space; the side plates are arranged in the wire fixing part and fixed between the top cover and the bottom plate; guide hole is provided on the bottom plate to communicate the wire fixing part and the fitting space; and
wherein blind hole is provided at the inner side of the top cover in the wire fixing part with the same axis of the guide hole, and projected along the axis, the sectional shapes of the blind hole and the guide hole are the same.

2. The sealing cover of claim 1, wherein the inner side of the top cover in the wire fixing part is parallel to the bottom plate.

3. The sealing cover of claim 2, wherein the side wall in the wire fixing part is provided with a wire guide port; the inner side of the top cover in the wiring fixing part is further provided with limiting plates, which protrude towards the bottom plate; the limiting plates are located between the blind hole and the wire guide port.

4. The sealing cover of claim 3, wherein a positioning plate disposed in the wiring fixing part is further provided; the positioning plate is connected between the top cover and the bottom plate, and the blind hole is located between the positioning plate and the wire guide port.

5. The sealing cover of claim 4, wherein the axis of the guide hole is perpendicular to the bottom plate.

6. The sealing cover of claim 5, wherein the number of the side plates is at least two and the side plates are mutually parallel to each other; the adjacent side plates, the bottom plate and the top cover together form a wiring space; each wiring space is provided with a guide hole and a blind hole opposing to the guide hole.

7. The sealing cover of claim 1, wherein projected along the axial direction of the guide holes, the blind hole is provided with a circular arc portion and a convex portion connected to one side of the circular arc portion; the convex portion protrudes outward along the radial direction of the circular arc portion.

* * * * *